(12) United States Patent
Lee et al.

(10) Patent No.: US 12,464,657 B2
(45) Date of Patent: Nov. 4, 2025

(54) DISPLAY DEVICE

(71) Applicant: LG Display Co., Ltd., Seoul (KR)

(72) Inventors: SeungHee Lee, Goyang-si (KR); Hyosung Lee, Gwangmyeong-si (KR)

(73) Assignee: LG DISPLAY CO., LTD., Seoul (KR)

( * ) Notice: Subject to any disclaimer, the term of this patent is extended or adjusted under 35 U.S.C. 154(b) by 236 days.

(21) Appl. No.: 17/986,394

(22) Filed: Nov. 14, 2022

(65) Prior Publication Data

US 2023/0217611 A1 Jul. 6, 2023

(30) Foreign Application Priority Data

Dec. 31, 2021 (KR) .................... 10-2021-0194518

(51) Int. Cl.
H05K 5/02 (2006.01)
H10K 77/10 (2023.01)
H10K 102/00 (2023.01)

(52) U.S. Cl.
CPC ......... H05K 5/0217 (2013.01); H10K 77/111 (2023.02); *H10K 2102/311* (2023.02)

(58) Field of Classification Search
CPC .......... H05K 5/00; H05K 5/0217; H05K 7/00; G09F 9/301; G06F 1/601; G06F 1/624; G06F 1/652; G06F 1/656; G06F 1/681; G06F 1/3218
USPC ........ 361/679, 749, 756, 759, 807–810, 814
See application file for complete search history.

(56) References Cited

U.S. PATENT DOCUMENTS

| | | | |
|---|---|---|---|
| 10,410,549 B1* | 9/2019 | Kim | G09F 9/301 |
| 10,534,402 B1* | 1/2020 | Kim | H05K 1/118 |
| 2006/0038745 A1* | 2/2006 | Naksen | G06F 1/1624 |
| | | | 257/40 |
| 2011/0132557 A1* | 6/2011 | Kuroi | G03B 21/58 |
| | | | 160/368.1 |
| 2013/0058063 A1 | 3/2013 | O'Brien | |
| 2016/0363960 A1* | 12/2016 | Park | G09F 15/0062 |
| 2018/0125228 A1* | 5/2018 | Porter | F16M 11/10 |
| 2018/0160554 A1* | 6/2018 | Kang | G06F 1/1652 |
| 2019/0198783 A1* | 6/2019 | Kim | H01L 27/156 |
| 2020/0077194 A1* | 3/2020 | Kim | H04R 9/025 |
| 2021/0208552 A1* | 7/2021 | Choi | G06F 1/1656 |
| 2021/0213830 A1 | 7/2021 | Son et al. | |
| 2021/0213831 A1 | 7/2021 | Kang et al. | |
| 2021/0392765 A1* | 12/2021 | Pyo | G06F 1/181 |

FOREIGN PATENT DOCUMENTS

| | | |
|---|---|---|
| KR | 10-2014-0059274 A | 5/2014 |
| KR | 10-2021-0090761 A | 7/2021 |
| KR | 10-2021-0090762 A | 7/2021 |

\* cited by examiner

*Primary Examiner* — Tuan T Dinh
(74) *Attorney, Agent, or Firm* — Morgan, Lewis & Bockius LLP

(57) ABSTRACT

A display device including a display panel, and a lifting part configured to move one end of the display panel in an upward or downward direction. The lifting part includes: a fixing unit fixed to the other end of the display panel a movable unit configured to move in the upward or downward direction, a motor connected to the movable unit and configured to move the movable unit in the upward or downward direction, and a panel connection block fixed to the movable unit and configured such that the one end of the display panel is fixed to the panel connection block.

14 Claims, 18 Drawing Sheets

HP(F1,F2,F3)

150(160,170,180,190)

DISPLAY DEVICE

CROSS-REFERENCE TO RELATED APPLICATIONS

This application claims the priority of Korean Patent Application No. 10-2021-0194518 filed on Dec. 31, 2021, in the Korean Intellectual Property Office, the disclosure of which is incorporated herein by reference.

BACKGROUND

Technical Field

The present disclosure relates to a display device, and more particularly, to a slidable display device capable of display images even though the slidable display device slides.

Discussion of the Related Art

In display devices used for a monitor of a computer, a TV set, a mobile phone, and the like, there are an organic light-emitting display (OLED) configured to autonomously emit light, and a liquid crystal display (LCD) that requires a separate light source.

The range of application of the display devices is diversified from the monitor of the computer and the TV set to personal mobile devices, and studies are being conducted on the display devices having wide display areas and having reduced volume and weight.

In addition, recently, a rollable display device, which is made by forming display parts, lines, and the like on a substrate made of a flexible plastic material having flexibility and thus may display images even in a case in which the rollable display device is rolled up, has attracted attention as a next-generation display device. Further, a slidable display device, in which a panel may be extended and inserted, also has attracted attention as a next-generation display device.

SUMMARY

Accordingly, embodiments of the present disclosure are directed to a display device that substantially obviates one or more of the problems due to limitations and disadvantages of the related art.

An aspect of the present disclosure is to provide a display device that may be capable of expanding a display area in a predetermined direction by expanding a display panel depending on a user's selection.

Another aspect of the present disclosure is to provide a display device that may be capable of stably and efficiently changing a display area of a display panel.

Yet another aspect of the present disclosure is to provide a display device that may be capable of ensuring a wider variable area of a display panel that is exposed to the outside.

The features and aspects of the present disclosure are not limited to those mentioned above. Additional features and aspects will be set forth in part in the description that follows and in part will become apparent to those skilled in the art from the description or may be learned by practice of the inventive concepts provided herein. Other features and aspects of the inventive concepts may be realized and attained by the structure particularly pointed out in, or derivable from, the written description, the claims hereof, and the appended drawings.

To achieve these and other aspects in accordance with the purpose of the disclosure, as embodied and broadly described herein, a display device comprises a display panel, and a lifting part configured to move one end of the display panel in an upward or downward direction. The lifting part may include: a fixing unit fixed to the other end of the display panel a movable unit configured to move in the upward or downward direction, a motor connected to the movable unit and configured to move the movable unit in the upward or downward direction, and a panel connection block fixed to the movable unit and configured such that the one end of the display panel is fixed to the panel connection block.

Other detailed matters of the example embodiments are included in the detailed description and the drawings.

According to the present disclosure, it may be possible to change the display area by expanding the display panel by using a motor, a belt, a sliding structure, and the like.

According to the present disclosure, it may be possible to increase the variable area of the display panel, which is exposed to the outside, and to stably support the deployed flexible display panel.

According to the present disclosure, it may be possible to change the area of the display area while allowing the flexible display panel, which is configured to be extended or retracted, to be kept flat without sagging or with reduced sagging.

The effects according to the present disclosure are not limited to the contents example effects described above, and more various additional effects may be included in the present disclosure or may be achieved by the practice of the present disclosure.

It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION

Figure 1A:
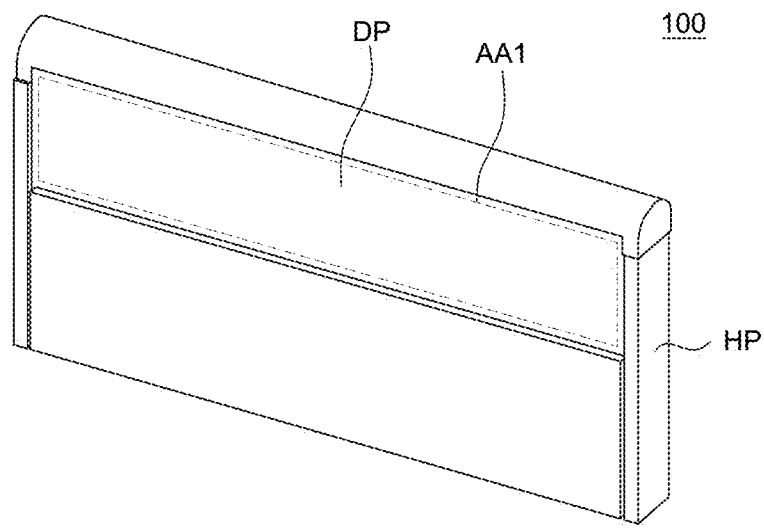
FIGS. 1A and 1B are perspective views of a display device according to an embodiment of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents.

The shapes, sizes, ratios, angles, numbers, and the like, which are illustrated in the drawings to describe various example embodiments of the present disclosure, are merely given by way of example. Therefore, the present disclosure is not limited to the illustrations in the drawings. Like reference numerals generally denote like elements throughout the specification, unless otherwise specified.

In the following description, where the detailed description of the relevant known function or configuration may unnecessarily obscure a feature or aspect of the present disclosure, a detailed description of such known function of configuration may be omitted.

Where the terms "comprise," "have," "include," and the like are used, one or more other elements may be added unless the term, such as "only," is used. An element described in the singular form is intended to include a plurality of elements, and vice versa, unless the context clearly indicates otherwise.

In construing an element, the element is to be construed as including an error or tolerance range even where no explicit description of such an error or tolerance range is provided.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween.

Where an element or layer is referred to as being "on" or "connected to" another element or layer, it should be understood to mean that the element or layer may be directly on or directly connected to the other element or layer, or that intervening elements or layers may be present. Also, where one element is referred to as being disposed "on" or "under" another element, it should be understood to mean that the elements may be so disposed to directly contact each other, or may be so disposed without directly contacting each other.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

A size and a thickness of each component illustrated in the drawings are illustrated for convenience of description, and the present disclosure is not limited to the illustrated size and the thickness of the component.

Features of various embodiments of the present disclosure may be partially or entirely coupled to or combined with each other. They may be linked and operated technically in various ways as those skilled in the art can sufficiently understand. The embodiments may be carried out independently of or in association with each other in various combinations.

Reference will now be made in detail to embodiments of the present disclosure, examples of which may be illustrated in the accompanying drawings.

<Display Device—Slidable Display Device>

The slidable display device may refer to a display device capable of displaying images even in a case in which the slidable display device slides. The slidable display device may have higher flexibility than a general display device in the related art. A shape of the slidable display device may be freely changed depending on whether the slidable display device is used. For example, when the slidable display device is not used, the slidable display device may be slid and stored in a state in which an exposed area of a panel is reduced. When the slidable display device is used, the slid slidable display device may be deployed again and used.

Figure 1B:
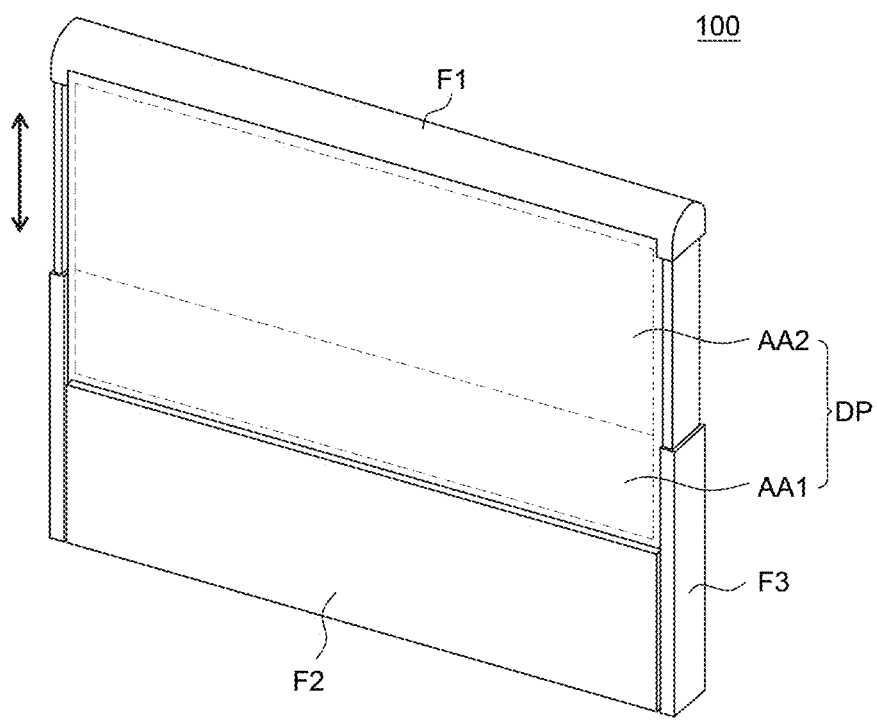

FIGS. 1A and 1B are perspective views of a display device according to an embodiment of the present disclosure.

First, as shown in FIGS. 1A and 1B, a display device 100 according to an embodiment of the present disclosure includes a display part DP and a housing part HP.

The display part DP is configured to display images to a user. For example, display elements and circuits, lines, and components for operating the display elements may be disposed on the display part DP. In this case, because the display device 100 according to an embodiment of the present disclosure is a slidable display device, the display part DP may be configured to be slidable. For example, the display part DP may include a display panel having flexibility to be slidable, a back cover, and a plurality of back bars. The display part DP will be described below in more detail with reference to FIGS. 2 and 3.

The housing part HP is a casing capable of accommodating the display part DP. The display part DP may be slid and accommodated in the housing part HP. The display part DP may be slid and disposed outside the housing part HP.

The housing part HP may include an upper frame F1, a lower frame, a front frame F2, a rear frame, and lateral frames F3. The lateral frames F3 of the housing part HP may further include guide rails that slide in conjunction with a movement of the lifting part. Therefore, it may be possible to prevent the display part DP from swaying when the display part DP moves upward or downward. An area of the display part DP, which is displayed to the outside, may vary in conjunction with a sliding motion of a lifting part and sliding motions of the lateral frames F3 of the housing part HP.

In some embodiments, the display part DP may include: a first display area AA1 exposed to the outside by the housing part HP when a movable unit of the lifting part to be described below is positioned at the lowermost side; and a second display area AA2 having a region that is exposed to the outside and varies depending on an upward/downward movement of the movable unit.

FIG. 1A illustrates a state in which the display part DP of the display device 100 is maximally contracted. The maximally contracted state may be defined as a state in which only the first display area AA1 of the display part DP of the display device 100 is exposed to the outside. The configuration in which the entire region of the display part DP is not exposed to the outside of the housing part HP may be advantageous in terms of an external appearance when the user does not need to view a wide image. Therefore, the maximally contracted state may be defined as a state in which the display part DP is slid and maximally accommodated in the housing part HP. In addition, in the state in which the display part DP is maximally contracted, only the required minimum display area of the display device 100 may be exposed, and the display device 100 may be easy to transport.

FIG. 1B illustrates a state in which the display part DP of the display device 100 is maximally expanded. The maximally expanded state may be defined as a state in which a minimum region of the display part DP of the display device 100 is accommodated in the housing part HP, and both the first display area AA1 and the second display area AA2 are exposed to the outside. That is, the maximally expanded state may be defined as a state in which the display part DP is slid and maximally disposed outside (uncovered by) the housing part HP and cannot be slid or extended any further to allow the user to see the image on the display device 100.

<Display Part>

Figure 2:
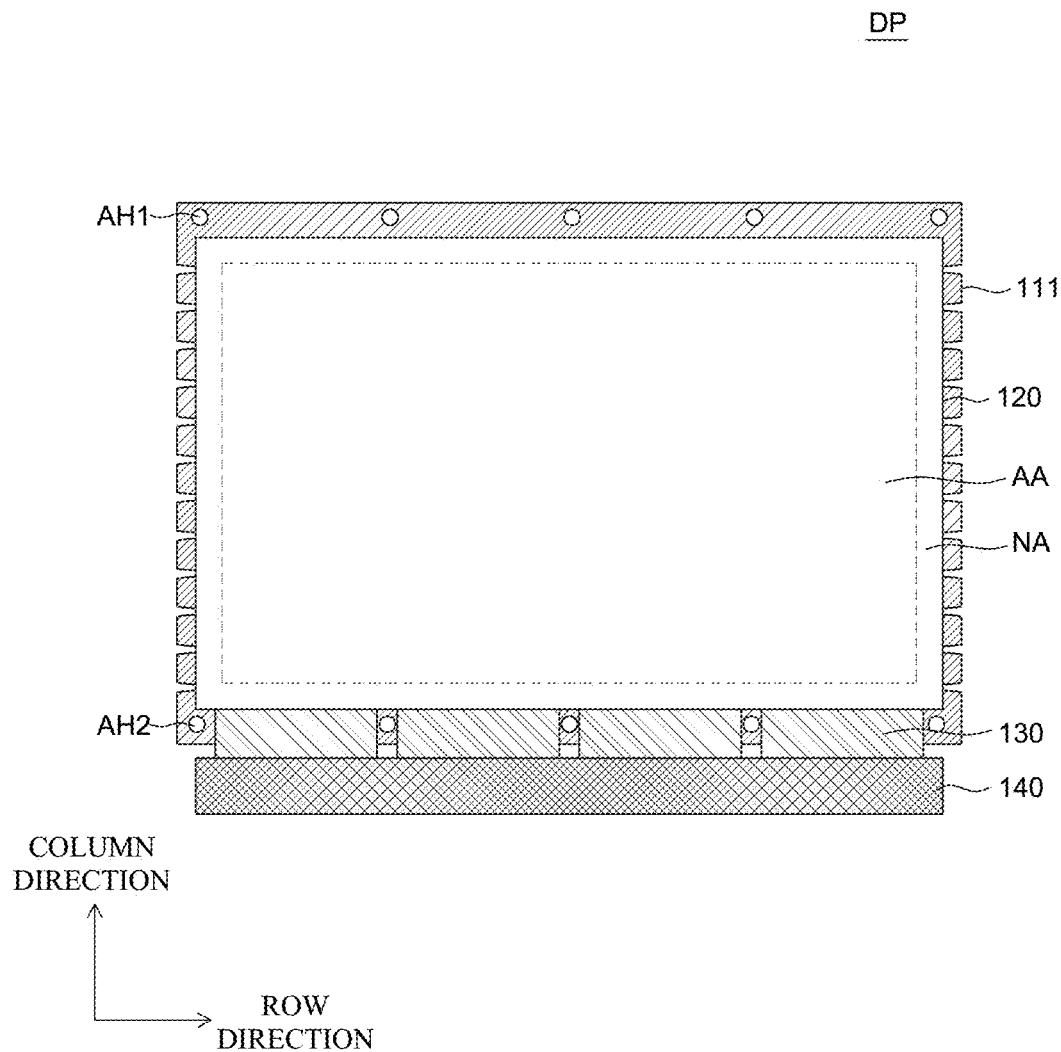
FIG. 2 is a top plan view of a display part of the display device according to an embodiment of the present disclosure.
Figure 3:
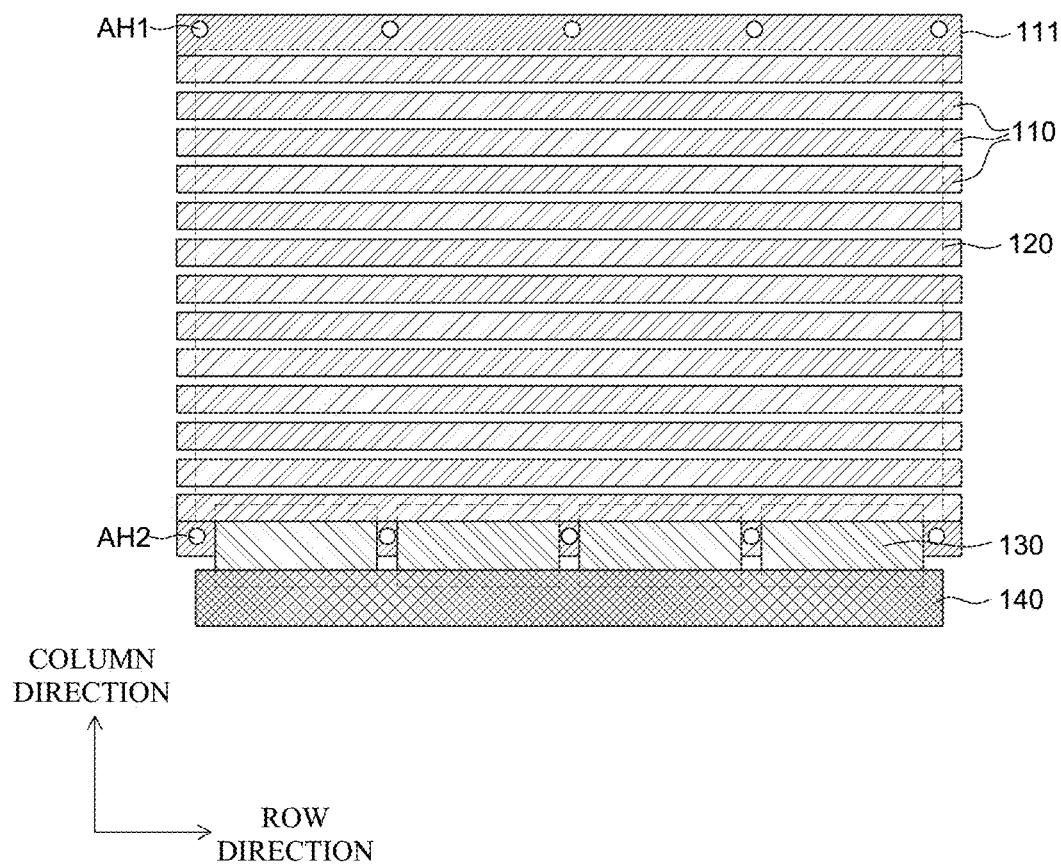
FIG. 3 is a rear view of the display part of the display device according to an embodiment of the present disclosure.

FIG. 2 is a top plan view of the display part of the display device according to an embodiment of the present disclosure. FIG. 3 is a rear view of the display part of the display device according to an embodiment of the present disclosure. As shown in FIGS. 2 and 3, the display part DP of the display device 100 includes a plurality of back bars 110, a back cover 111, a display panel 120, a flexible film 130, and a printed circuit board 140.

The display panel 120 is a panel configured to display images to a user. The display panel 120 may include a display element configured to display images, a driving element configured to operate the display element, and lines configured to transmit various types of signals to the display element and the driving element.

Depending on the type of display panels 120, different display elements may be used. In an embodiment, the display panel 120 is an organic light-emitting display panel, and the display element may be an organic light-emitting element including an anode, an organic light-emitting layer, and a cathode. In another embodiment, the display panel 120 is a liquid crystal display panel, and the display element may be a liquid crystal display element. In yet another embodiment, the display panel 120 is a light-emitting display panel including an LED, and the display element may be the LED. In some embodiments of the present disclosure, the display panel 120 is a organic light-emitting display panel. However, the display panel 120 is not limited to the organic light-emitting display panel. In addition, because the display device 100 according to an embodiment of the present disclosure is a slidable display device, the display panel 120 may be implemented as a flexible display panel to be slid.

As shown in FIG. 2, the display panel 120 includes a display area AA and a non-display area NA.

The display area AA is an area of the display panel 120 in which images are displayed. The display area AA may include a plurality of subpixels constituting the plurality of pixels, and a drive circuit configured to operate the plurality of subpixels. The plurality of subpixels may be the minimum units constituting the display area AA. The display element may be disposed in each of the plurality of subpixels. For example, the plurality of subpixels may each include the light-emitting element including the anode, a light-emitting part, and a cathode. However, the present disclosure is not limited thereto. In addition, the circuit configured to operate the plurality of subpixels may include driving elements, lines, and the like. For example, the circuit may include, but not limited to, a thin-film transistor, a storage capacitor, a gate line, a data line, and the like. Further, as described above, the display part AA may include: the first display area AA1 exposed to the outside by the housing part HP when the movable unit of the lifting part is positioned at the lowermost side; and the second display area AA2 having the region that is exposed to the outside and varies depending on a movement of the movable unit in the upward/downward movement.

The non-display area NA is an area in which no image is displayed. The non-display area NA surrounds an outer periphery of the display area AA. Various lines and circuits for operating the organic light-emitting element in the display area AA are disposed in the non-display area NA. For example, the non-display area NA may include, but not limited to, link lines for transmitting signals to the plurality of subpixels and the circuit in the display area AA. The non-display area NA may include a drive IC such as a gate driver IC and a data driver IC.

The flexible film 130 is a film having various types of components disposed on a base film having flexibility. The flexible film 130 may have ductility. A partial region of the flexible film 130, together with a ductile area MA, may be wound around or unwound from a roller part. The flexible film 130 may supply signals to the plurality of subpixels and the circuit in the display area AA. The flexible film 130 may be electrically connected to the display panel 120. The flexible film 130 is disposed at one end of the non-display area NA of the display panel 120 and supplies a power voltage, a data voltage, and the like to the plurality of subpixels and the circuit in the display area AA. The number of flexible films 130 illustrated in FIG. 2 is an example, and the number of flexible films 130 may be variously changed in accordance with design. However, the present disclosure is not limited thereto.

In an embodiment, the drive IC such as the gate driver IC and the data driver IC may also be disposed on the flexible film 130. The drive IC is a component configured to process data for displaying the image and process a driving signal for processing the data. The drive IC may be disposed in ways such as a chip-on-glass (COG) method, a chip-on-film (COF) method, and a tape carrier package (TCP) method depending on how the drive IC is mounted. For the convenience of description, the present disclosure describes a configuration in which the drive IC is mounted on the flexible film 130 by the chip-on-film method. However, the present disclosure is not limited thereto.

The printed circuit board 140 is disposed at one end of the flexible film 130 and connected to the flexible film 130. The printed circuit board 140 is a component for supplying a signal to a drive IC. The printed circuit board 140 supplies various signals such as driving signal and data signals to the drive IC. Various types of components may be disposed on the printed circuit board 140. For example, a timing controller, a power source unit, and the like may be disposed on the printed circuit board 140. FIG. 2 illustrates one printed circuit board 140. However, the present disclosure is not limited thereto. The number of printed circuit boards 140 may be variously changed in accordance with design.

Although not illustrated in FIG. 2, some embodiments of the display device may include an additional printed circuit board connected to the printed circuit board 140. For example, the printed circuit board 140 may be a source printed circuit board (source PCB (S-PCB)) on which a data drive part is mounted. The additional printed circuit board connected to the printed circuit board 140 may be a control printed circuit board (control PCB (C-PCB)) on which the timing controller and the like are mounted. The additional printed circuit board may be disposed in the roller part. The additional printed circuit board may be provided outside the roller part and disposed inside the housing part HP.

As shown in FIGS. 2 and 3, the back cover 111 may be disposed on the rear surface of the display panel 120 and support the display panel 120, the one or more flexible films 130, and the printed circuit board 140. A size of the back cover 111 may be larger than a size of the display panel 120. The back cover 111 may protect the other components of the display part DP from the external environment.

The back cover 111 may be made of a material having rigidity. At least a part of the back cover 111 may have flexibility to be slid together with the display panel 120. For example, the back cover 111 may be made of a metallic material such as stainless steel (steel use stainless (SUS)) or Invar or a plastic material. However, the present disclosure is not limited thereto. The material of the back cover 111 may be variously changed in accordance with design as long as the material of the back cover 111 satisfies physical property conditions such as, but not limited to, a thermal deformation amount, a radius of curvature, rigidity, and the like. In addition, the back cover 111 may include a plurality of opening portions. A width of each of the plurality of opening portions in a direction perpendicular to the sliding direction may be larger than a width of each of the plurality of opening portions in the sliding direction.

As shown in FIG. 3, the plurality of back bars 110 may be disposed on the rear surface of the display panel 120 and the rear surface of the back cover 111. The plurality of back bars 110 may support the display panel 120 and the back cover 111. The plurality of back bars 110 may provide a supporting force to support the display panel 120 when the display panel 120 slides, thereby preventing or reducing the possibility of the display panel 120 from being scratched and damaged. The plurality of back bars 110 may each be referred to as an apron. The plurality of back bars 110 may be made of a plastic material. However, the present disclosure is not limited thereto. The plurality of back bars 110 may be attached by means of a separate bonding layer or a foam tape.

FIGS. 2 and 3 illustrate that the back cover 111 and the plurality of back bars 110 are disposed on the rear surface of the display panel 120. In some embodiments, only the plurality of back bars 110 may be disposed on the rear surface of the display panel 120. Alternatively, only the back cover 111 may be disposed on the rear surface of the display panel 120.

<Coupling Structure of Lifting Part>

Figure 4A:
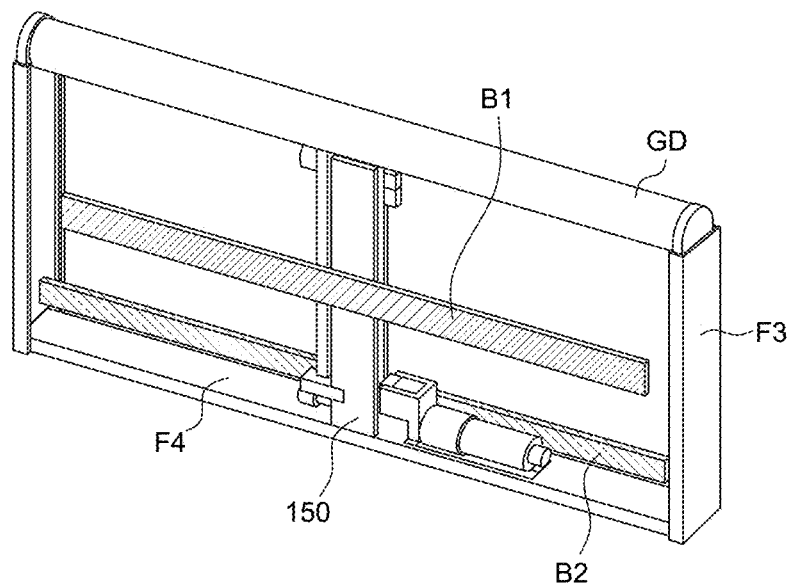
FIGS. 4A and 4B are front perspective views of the display device according to an embodiment of the present disclosure.
Figure 4B:
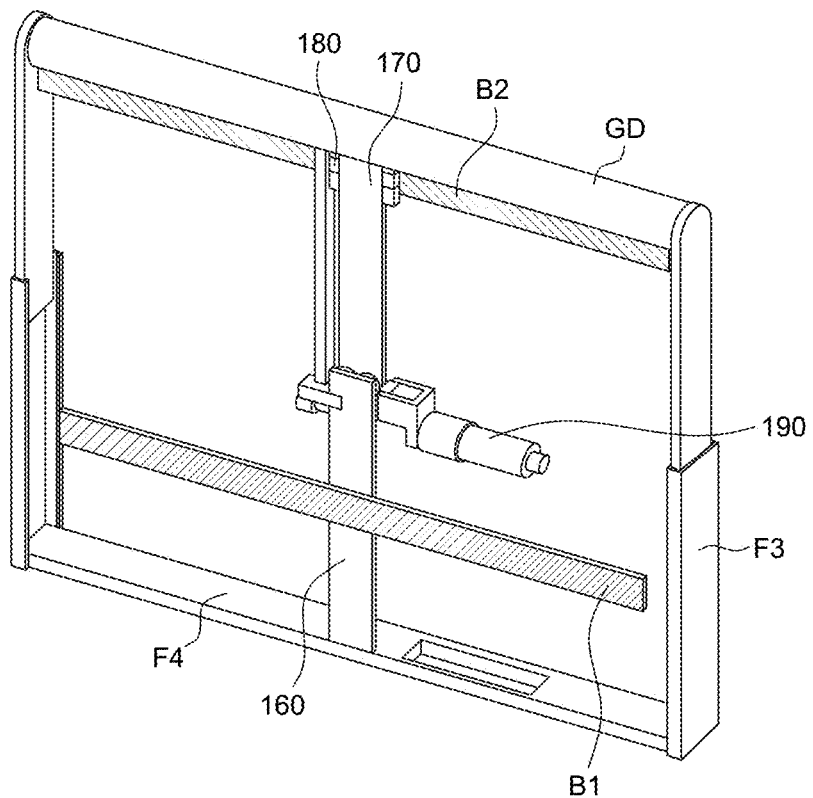
Figure 5A:
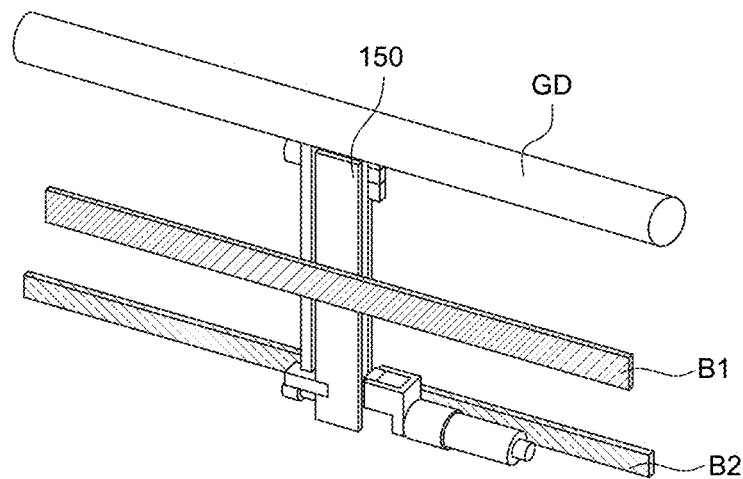
FIGS. 5A and 5B are front perspective views of a lifting part of the display device according to an embodiment of the present disclosure.
Figure 5B:
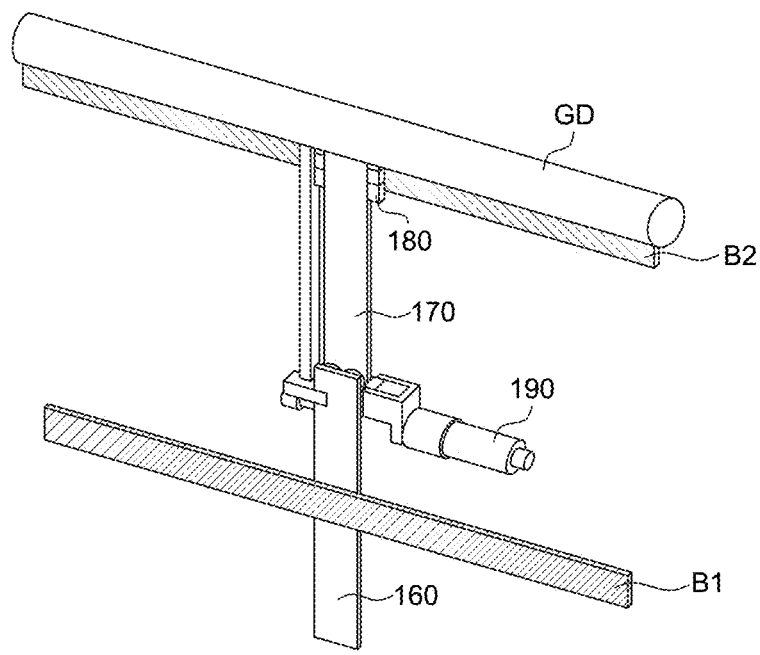
Figure 6A:
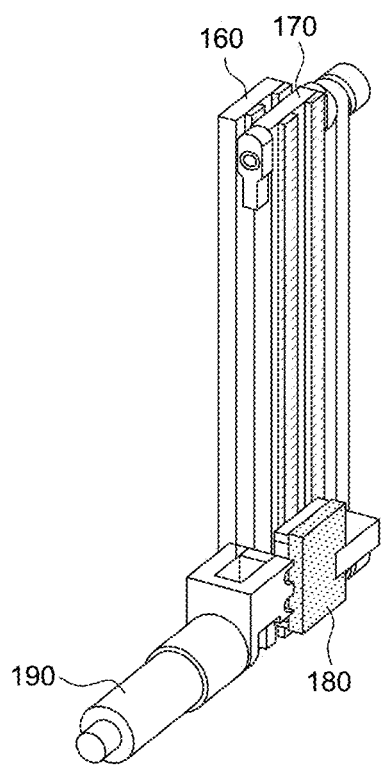
FIGS. 6A and 6B are rear perspective views of the lifting part of the display device according to an embodiment of the present disclosure.
Figure 6B:
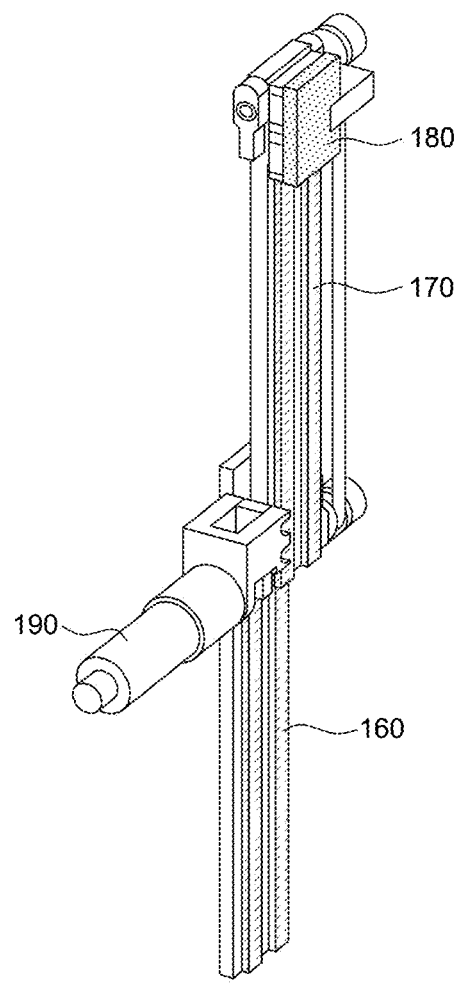

FIGS. 4A and 4B are front perspective views of the display device according to an embodiment of the present disclosure. FIGS. 5A and 5B are front perspective views of a lifting part of the display device according to an embodiment of the present disclosure. FIGS. 6A and 6B are rear perspective views of the lifting part of the display device according to an embodiment of the present disclosure. For the convenience of description, the display panel 120 is omitted in FIGS. 4A and 4B. FIGS. 4A, 5A, and 6A are views illustrating embodiments in which the movable unit 170 of the lifting part 150 is positioned at a lowermost position. FIGS. 4B, 5B, and 6B are views illustrating a case in which the movable unit 170 of the lifting part 150 is positioned at the uppermost position.

As shown in FIGS. 4A to 6B, the display device 100 according to an embodiment of the present disclosure further includes a lifting part 150, a guide drum GD, and fixing blocks B1 and B2.

The lifting part 150 is a device that moves and slides one end of the display panel 120 in the upward/downward direction. The lifting part 150 may include a fixing unit 160, a movable unit 170, a panel connection block 180, and a motor 190.

The fixing unit 160 serves to fix the display panel 120 and the lifting part 150 to the display device 100. That is, the fixing unit 160 may be fixed to a lower frame F4 of the housing part HP of the display device 100. The first fixing block B1 having a bar shape is fastened to a central portion of the fixing unit 160, such that the other end of the display panel 120 may be fixed. In addition, the other end of the fixing unit 160 may be fixed to the lower frame F4 of the housing part HP, and one end of the fixing unit 160 may be fastened to the movable unit 170 of the lifting part 150. Therefore, even when the lifting part 150 moves upward or downward, the fixing unit 160 may be fixed without moving or with reduced movement and serve to support the other components of the lifting part 150 so that the components of the lifting part 150 may smoothly move. The components of the fixing unit 160 will be described below in detail with reference to FIGS. 7 and 8.

The movable unit 170 of the lifting part 150 serves to move an end of the display panel 120 while rectilinearly moving in the upward/downward direction based on the fixing unit 160. One end of the movable unit 170 may be connected to the fixing unit 160, and the other end of the movable unit 170 may be connected to the panel connection block 180. In addition, the motor 190 is connected to the movable unit 170, such that the movable unit 170 may rectilinearly move in conjunction with a rotation of the motor 190, and the end of the display panel 120 may move in the upward/downward direction. The components of the movable unit 170 will be described below in detail with reference to FIGS. 7, 9A, and 9B.

The panel connection block 180 of the lifting part 150 serves to fix the display panel 120 to the lifting part 150. That is, one end of the panel connection block 180 may be connected to the movable unit 170 of the lifting part 150, and the other end of the panel connection block 180 may be connected to the back cover 111, which is disposed at the rear surface of the display panel 120, by means of a second fixing block B2. Therefore, when the movable unit 170 rectilinearly moves, the panel connection block 180 also moves in the vertical direction, such that the end of the display panel 120 may move. The components of the panel connection block 180 will be described below in detail with reference to FIGS. 7, 10A, and 10B.

The guide drum GD is disposed at an end of the movable unit 170 of the lifting part 150. The guide drum GD may be disposed in a direction perpendicular to the direction of the rectilinear motion of the movable unit 170 and support the display panel 120. The longitudinal axis of the guide drum GD may be perpendicular to the direction of the rectilinear motion of the movable unit 170. Because the display panel 120 of the sliding display device, such as the display device 100 according to the present disclosure, has flexibility, a device capable of supporting the display panel 120 may be required so that the display panel 120 is kept flat without being wrinkled or with reduced wrinkles during the sliding operating process. The guide drum GD is disposed at an upper side of the movable unit 170 of the lifting part 150 and elongated horizontally in a direction perpendicular to the upward/downward movement of the lifting part 150. The guide drum GD may include a fixing roller. In this case, the fixing roller may have a cylindrical shape. A cross-sectional shape of the fixing roller may be a circular shape.

When the lifting part 150 moves upward or downward, the guide drum GD may also move upward or downward together with the lifting part 150. In this case, the guide drum GD may serve as a support such that the display panel 120 may move along a surface of the guide drum GD. That is, the display panel 120 may tensely slide along a periphery of the guide drum GD.

The fixing blocks B1 and B2 may include a first fixing block B1 and a second fixing block B2. The first fixing block B1 may be disposed in a central region of the fixing unit 160 of the lifting part 150. The second fixing block B2 may be disposed at the top of the panel connection block 180 of the lifting part 150.

The fixing blocks B1 and B2 are disposed to fix two opposite ends of the display panel 120. Therefore, the first fixing block B1 may have a bar shape connected to the fixing unit 160 to fix the other end of the display panel 120 to the fixing unit 160 of the lifting part 150. The second fixing block B2 may have a bar shape connected to the panel connection block 180 to fix one end of the display panel 120 to the panel connection block 180 of the lifting part 150. For example, the first fixing block B1 serves to fix the other end of the display panel 120 to the fixing unit 160 of the lifting part 150 as the printed circuit board 140 of the display panel 120 or the back cover 111 is fixed by the first fixing block B1. The second fixing block B2 serves to fix one end of the display panel 120 to the panel connection block 180 of the lifting part 150 as the back cover 111 is fixed by the second fixing block B2.

In the display device 100 according to an embodiment of the present disclosure, the lifting part 150 may rectilinearly move in the upward/downward direction, thereby allowing the display panel 120 to slide. Hereinafter, an example configuration of the lifting part 150 will be described with reference to FIGS. 7 to 9B.

<Configuration of Lifting Part>

Figure 7:
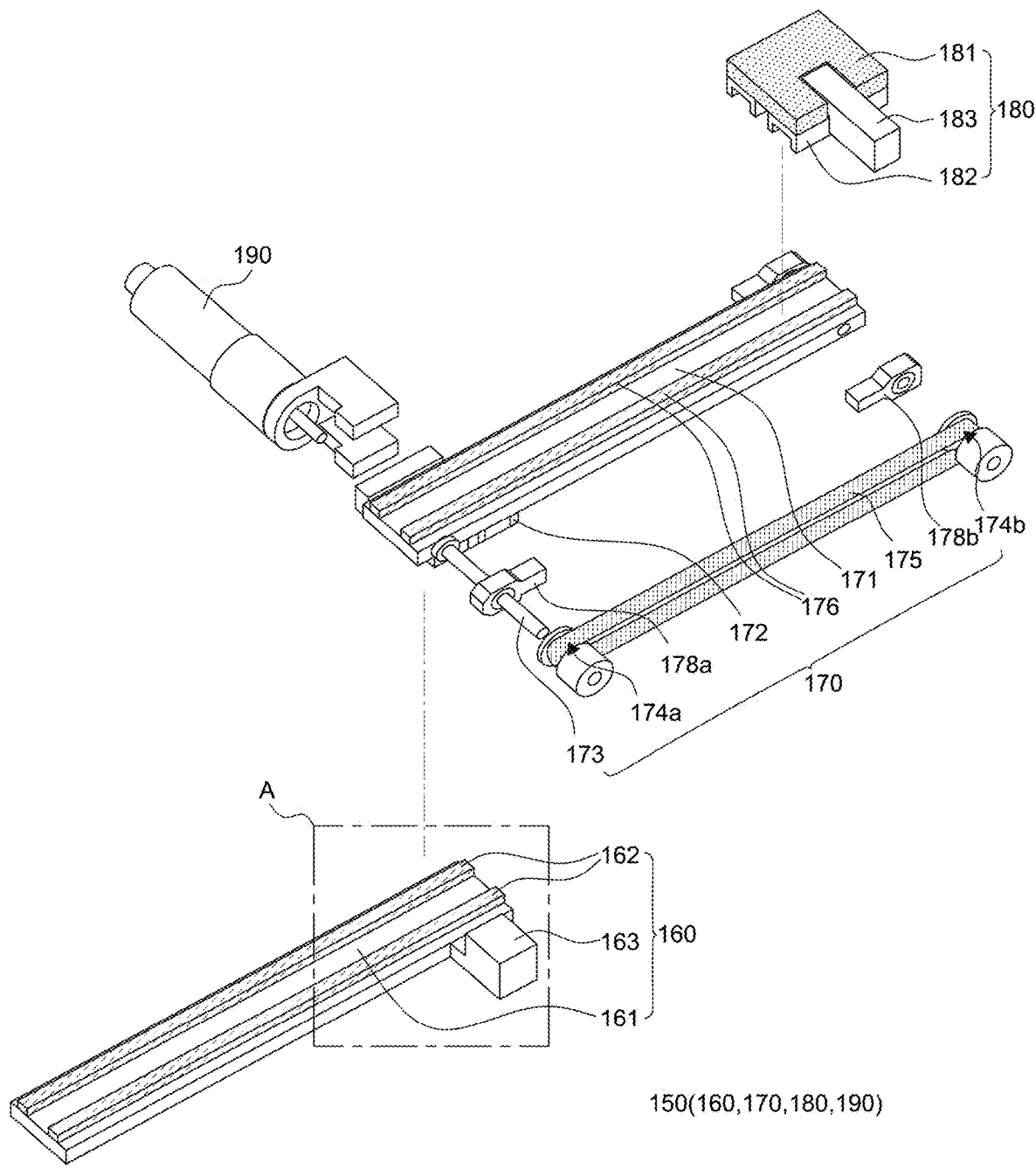
FIG. 7 is an exploded perspective view of the lifting part of the display device according to an embodiment of the present disclosure.
Figure 8:
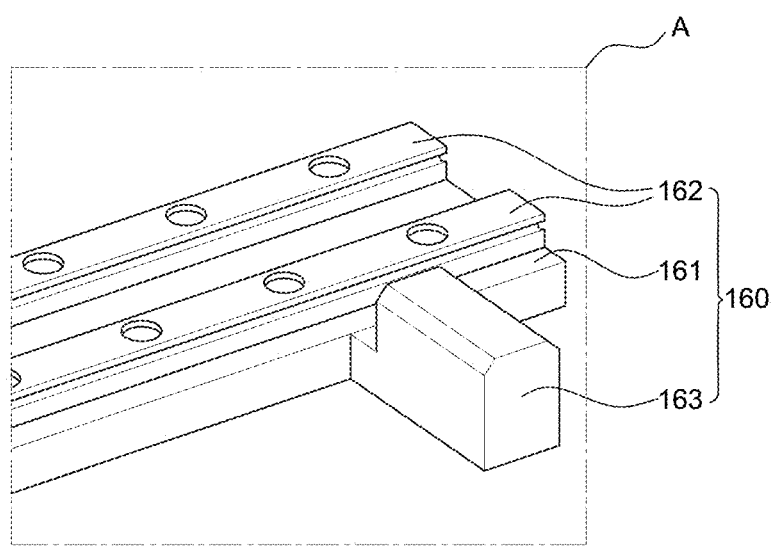
FIG. 8 is an enlarged view of a fixing unit of the lifting part of the display device according to an embodiment of the present disclosure.
Figure 9A:
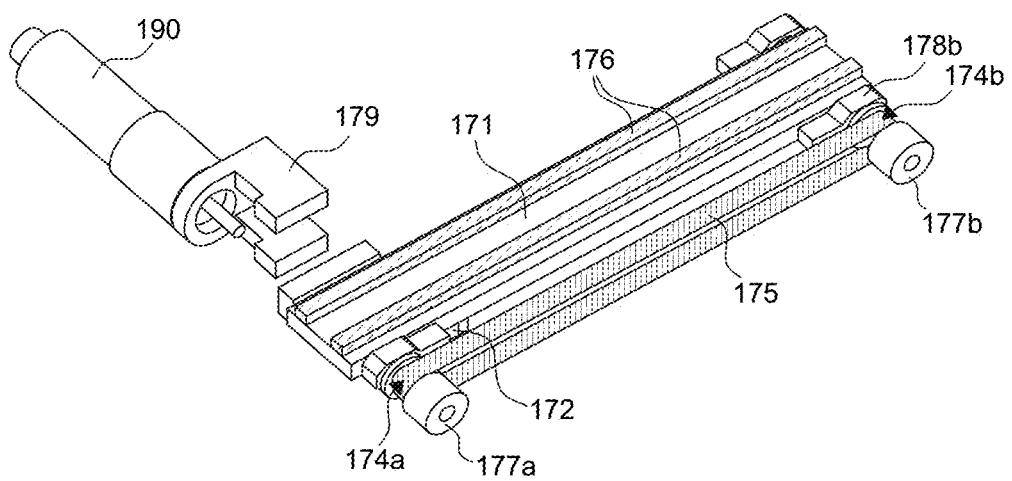
FIGS. 9A and 9B are exploded perspective views of a movable unit of the lifting part of the display device according to an embodiment of the present disclosure.
Figure 9B:
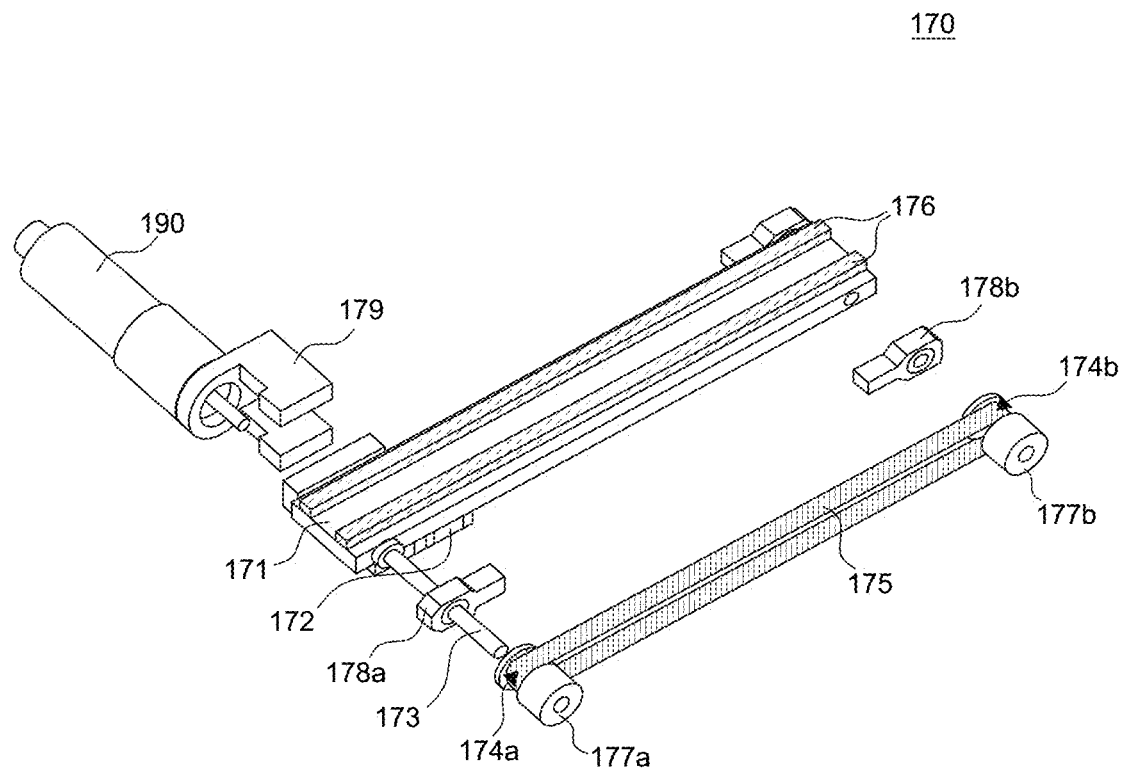
Figure 10A:
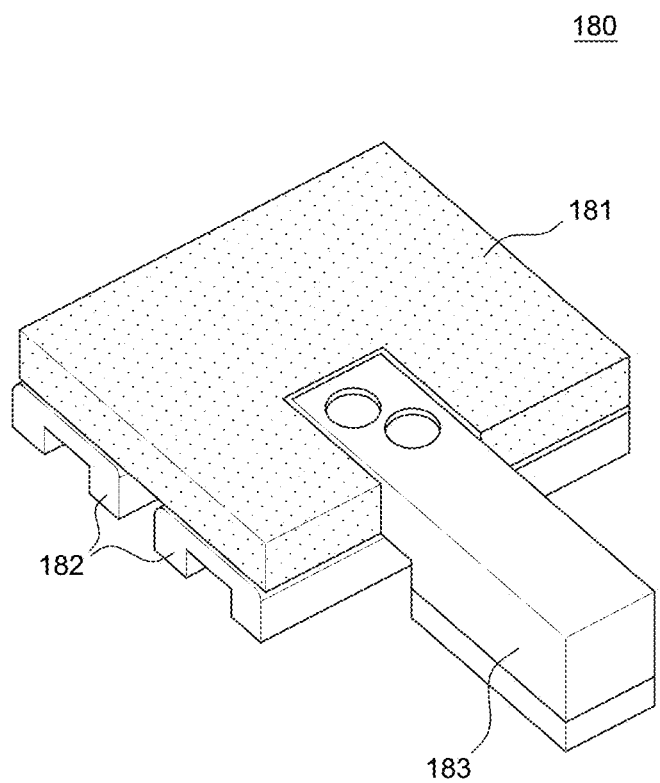
FIGS. 10A and 10B are enlarged views of a panel connection block of the lifting part of the display device according to an embodiment of the present disclosure.
Figure 10B:
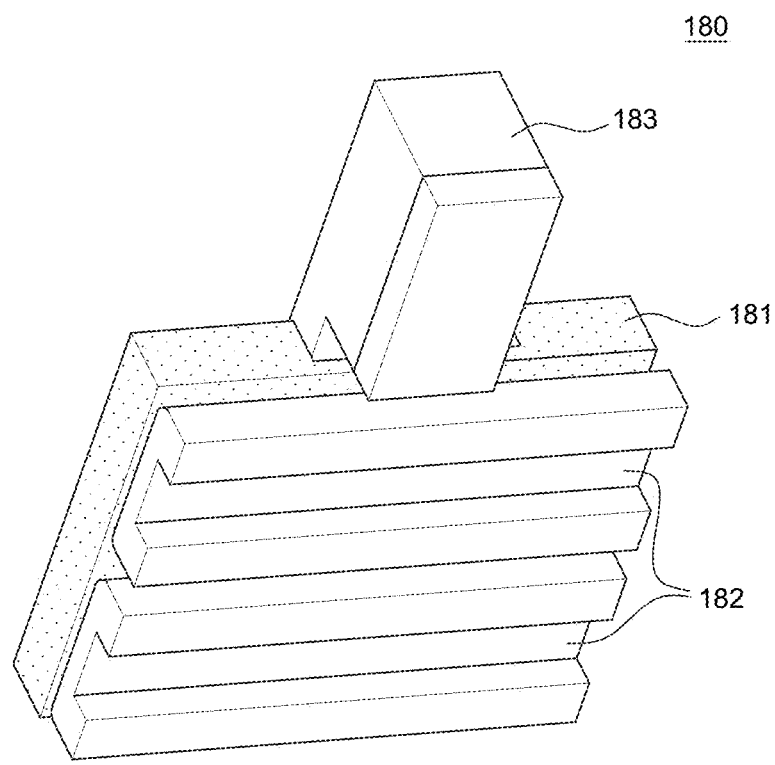

FIG. 7 is an exploded perspective view of the lifting part of the display device according to an embodiment of the present disclosure. FIG. 8 is an enlarged view of the fixing unit of the lifting part of the display device according to an embodiment of the present disclosure. FIGS. 9A and 9B are exploded perspective views illustrating the movable unit of the lifting part of the display device according to an embodiment of the present disclosure. FIGS. 10A and 10B are enlarged views illustrating the panel connection block of the lifting part of the display device according to an embodiment of the present disclosure.

First, as described above, the lifting part 150 may include the fixing unit 160, the movable unit 170, the panel connection block 180, and the motor 190.

As shown in FIGS. 7 and 8, the fixing unit 160 of the lifting part 150 may include a first base portion 161, a first rail portion 162, and a first belt fastening portion 163.

The first base portion 161 of the fixing unit 160 is a support body fixed to the lower frame F4 of the housing part HP. The first base portion 161 may support the first rail portion 162 and maintain a stable state by restricting or reducing swaying and torsion of the fixing unit 160. A rear surface of the first rail portion 162 is disposed on the first base portion 161. The first base portion 161 is formed to have a length corresponding to a half of a maximum height of the lifting part 150. The first rail portion 162 and the first belt fastening portion 163 of the fixing unit 160 are connected and fixed to the first base portion 161.

The first rail portion 162 is fixed to one surface of the first base portion 161 and installed in straight lines. The movable unit 170 of the lifting part 150 may move while sliding along the first rail portion 162. For example, the first rail portion 162 may be a guide rail, and the first rail portion 162 may be connected and fixed to one surface of the first base portion 161. The first rail portion 162 may be formed to have a length corresponding to the first base portion 161. The first rail portion 162 may include two guide rails disposed in parallel to face each other. The first rail portion 162 determines a movement route for the movable unit 170 including a second rail portion 172 that may operate in conjunction with the first rail portion 162. That is, the movable unit 170 may rectilinearly move in the vertical direction along a trajectory defined by the first rail portion 162.

The first belt fastening portion 163 may be disposed at one side of the first base portion 161 of the fixing unit 160 and fastened to a belt 175 included in the movable unit 170. Although not illustrated in the drawings, the first belt fastening portion 163 may have a fastening groove so that the first belt fastening portion 163 may be fastened to the belt 175. However, the method of fastening the first belt fastening portion 163 and the belt 175 is not limited thereto. Various fastening methods may be used.

Therefore, because the first belt fastening portion 163 is fastened to the belt 175 of the movable unit 170 in the state in which the first belt fastening portion 163 is fixed to the fixing unit 160, the first belt fastening portion 163 may be synchronized with a motion of the belt 175 in response to a rotational force of the motor 190. That is, when the belt 175 is rotated by the rotation of the motor 190, the first belt fastening portion 163 also moves. Because the first base portion 161 connected to the first belt fastening portion 163 is fixed to the lower frame F4, the movable unit 170 including the belt 175 is moved upward or downward relative to the fixing unit 160.

Next, the motor 190 may be fixed to the movable unit 170. The motor 190 may be connected to a power generator such as a separate external power source or an embedded battery and supplied with power. The motor 190 may generate rotational power by using electrical energy and provide driving power to the movable unit 170 by transmitting the rotational power to a connection shaft 173. In addition, because the motor 190 is fixed to the movable unit 170, the motor 190 may move upward or downward along with the upward/downward movement of the movable unit 170.

As shown in FIGS. 7, 9A, and 9B, among the components of the lifting part 150, the movable unit 170 may include a second base portion 171, the second rail portion 172, the connection shaft 173, belt pulleys 174a and 174b, the belt 175, anti-separation members 177a and 177b, spacing members 178a and 178b, a motor fixing unit 179, and a third rail portion 176.

The second base portion 171 of the movable unit 170 is a support body of the movable unit 170 to which the motor 190 is fixed. The second base portion 171 may be disposed between the second rail portion 172 and the third rail portion 176 and support the third rail portion 176. A rear surface of the third rail portion 176 is disposed on the second base portion 171. The second base portion 171 may maintain a stable state by restricting or reducing swaying and torsion of the movable unit 170. The second base portion 171 is formed to have a length corresponding to a half of the maximum height of the lifting part 150. The second rail portion 172, the third rail portion 176, and the connection shaft 173 of the movable unit 170 are connected and fixed to the second base portion 171.

The second rail portion 172 of the movable unit 170 is fixed to and disposed on a rear surface of the second base portion 171, i.e., a lower surface of the second base portion 171 adjacent to the fixing unit 160, such that the second rail portion 172 operates in conjunction with the first rail portion 162 of the fixing unit 160. Because the second rail portion 172 may need to be rail-coupled to the first rail portion 162 of the fixing unit 160, the movable unit 170 includes a rail structure that guides the movable unit 170 when the movable unit 170 slides in the vertical direction relative to the fixing unit 160. That is, the second rail portion 172 may include a plurality of grooves coupled to the first rail portion 162. In a case in which the first rail portion 162 includes the two rails disposed in parallel to face each other as illustrated in FIG. 7, the second rail portion 172 may have two grooves so that the two rails of the first rail portion 162 may be coupled to the second rail portion 172. The second rail portion 172 may be shorter than the second base portion 171 because the second rail portion 172 may only need to operate in conjunction with the first rail portion 162.

The connection shaft 173 of the movable unit 170 may be fixed to the second base portion 171 and connected to the motor 190 and the first belt pulley 174a. The connection shaft 173, the belt pulleys 174a and 174b, and the belt 175 of the movable unit 170 may be connected to the motor 190 and convert the rotational motion from the motor 190 into the rectilinear motion. The connection shaft 173 receives the rotational force from the motor 190 and rotates about a rotation axis. The belt pulleys 174a and 174b fastened to the connection shaft 173 also receive the rotational force of the motor 190 and rotate about the connection shaft 173. Therefore, in response to the rotational motion of the connection shaft 173, the belt 175 may rotate or move along with the belt pulleys 174a and 174b.

The connection shaft 173 is fixed to penetrate the second base portion 171 and rotatably fastened to the second base portion 171. Therefore, the motion of the connection shaft 173 may be restricted except for the rotational motion of the connection shaft 173 about the rotation axis.

Additionally, the movable unit 170 may further include the motor fixing unit 179 so that the motor 190 and the connection shaft 173 may easily rotate. The motor fixing unit 179 is disposed between the second base portion 171, the connection shaft 173, and the motor 190 and fixes the motor 190 so that the motor 190 does not separate from the movable unit 170 of the lifting part 150.

The movable unit 170 includes the belt 175, and the belt pulleys 174a and 174b configured to rotate to move the belt 175. The belt pulleys 174a and 174b are rotatably fixed to the second base portion 171. The belt pulleys 174a and 174b are provided as a pair of left and right pulleys. The belt pulleys 174a and 174b are disposed at both ends of the second base portion 171 and connected to the belt 175. In this case, the pair of belt pulleys 174a and 174b may include a first belt pulley 174a and a second belt pulley 174b. The first belt pulley 174a is connected to the connection shaft 173, and the second belt pulley 174b rotates in conjunction with the first belt pulley 174a. For example, teeth may be formed on outer surfaces of the belt pulleys 174a and 174b, and grooves may be formed in an inner surface of the belt 175 and engage with the teeth of the belt pulleys 174a and 174b. However, the present disclosure is not limited thereto.

As described above, the belt pulleys 174a and 174b may receive the rotational force of the motor 190 from the connection shaft 173, and the belt 175 may rotate or move in response to receiving the driving power from the belt pulleys 174a and 174b. As a result, the belt 175 is wound around the first belt pulley 174a and the second belt pulley 174b. Therefore, when the motor 190 rotates in one direction, power may be transmitted to the belt 175 through the belt pulleys 174a and 174b, and the power may be transmitted to the first belt fastening portion 163 and a second belt fastening portion 183 that are coupled to the belt 175. Therefore, the first belt fastening portion 163 and the second belt fastening portion 183 move, and the movable unit 170 and the panel connection block 180 move.

Additionally, the movable unit 170 may further include the anti-separation members 177a and 177b and the spacing members 178a and 178b so that the belt pulleys 174a and 174b and the belt 175 may easily rotate or move. The anti-separation members 177a and 177b may be disposed at a lateral side of the belt 175. The first anti-separation member 177a and the second anti-separation member 177b may be respectively fastened to the first belt pulley 174a and the second belt pulley 174b. The anti-separation members 177a and 177b are disposed at the lateral sides of the belt 175 and the belt pulleys 174a and 174b, such that the belt 175 may stably rotate or move without being separated. In addition, the spacing members 178a and 178b are disposed between the belt pulleys 174a and 174b and the second base portion 171 and allow the belt 175 to be spaced apart from the second base portion 171 so that the second base portion 171 does not hinder the motion of the belt 175 when the belt 175 rotates or moves. The spacing members 178a and 178b may include a first spacing member 178a configured to adjoin the first belt pulley 174a, and a second spacing member 178b configured to adjoin the second belt pulley 174b.

The third rail portion 176 of the movable unit 170 is fixed to one surface of the second base portion 171 and installed in straight lines. The panel connection block 180 of the lifting part 150 may slide along the third rail portion 176. For example, the third rail portion 176 may be a guide rail, and the third rail portion 176 may be connected and fixed to one surface of the second base portion 171. The third rail portion 176 may be formed to have a length corresponding to the second base portion 171. The third rail portion 176 may include two rails disposed in parallel to face each other. The third rail portion 176 determines a movement route for the panel connection block 180 including a fourth rail portion 182 that may operate in conjunction with the third rail portion 176. That is, the panel connection block 180 may rectilinearly move in the vertical direction along a trajectory defined by the third rail portion 176.

Lastly, as shown in FIGS. 7, 10A, and 10B, among the components of the lifting part 150, the panel connection block 180 may include a third base portion 181, the fourth rail portion 182, and the second belt fastening portion 183.

The third base portion 181 of the panel connection block 180 is a support body of the panel connection block 180 to which the end of the display panel 120 is connected. The third base portion 181 may support the fourth rail portion 182 and maintain a stable state by restricting or reducing swaying and torsion of the panel connection block 180. The third base portion 181 is formed to have a length corresponding to the fourth rail portion 182. The fourth rail portion 182 and the second belt fastening portion 183 of the panel connection block 180 are connected and fixed to the third base portion 181. Additionally, the second fixing block B2 having a bar shape, to which the back cover 111 is fixed, may be fixed to the panel connection block 180. Therefore, when the panel connection block 180 moves vertically in the upward/downward direction, the second fixing block B2 and the display panel 120, which are connected to the panel connection block 180, may move upward or downward.

The fourth rail portion 182 of the panel connection block 180 is fixed to and disposed on a rear surface of the third base portion 181, i.e., a lower surface of the third base portion 181 adjacent to the movable unit 170, such that the fourth rail portion 182 operates in conjunction with the third rail portion 176 of the movable unit 170. Because the fourth rail portion 182 may need to be rail-coupled to the third rail portion 176 of the movable unit 170, the panel connection block 180 includes a rail structure that guides the panel connection block 180 when the panel connection block 180 slides with respect to the movable unit 170. That is, the fourth rail portion 182 may include a plurality of grooves to which protruding portions of the third rail portion 176 are coupled. In a case the third rail portion 176 is configured as the two rails disposed in parallel to face each other as illustrated in FIG. 7, the fourth rail portion 182 may be configured as two grooves so that the two rails of the third rail portion 176 are coupled to the fourth rail portion 182. Because the fourth rail portion 182 is disposed to operate in conjunction with the third rail portion 176, the fourth rail portion 182 may not be installed to have a length corresponding to the first base portion 161 and the second base portion 171. The fourth rail portion 182 may be shorter than the first base portion 161 and the second base portion 171, as illustrated in FIG. 7.

The second belt fastening portion 183 may be disposed at one side of the third base portion 181 of the panel connection block 180 and fastened to the belt 175 included in the movable unit 170. The second belt fastening portion 183 may have a fastening groove so that the panel connection block 180 may be fastened to the belt 175. However, the method of fastening the second belt fastening portion 183 and the belt 175 is not limited thereto.

Because the second belt fastening portion 183 is fastened to the belt 175 of the movable unit 170 in the state in which the second belt fastening portion 183 is fixed to the panel connection block 180, the second belt fastening portion 183 may be synchronized with the motion of the belt 175 in response to the rotational force of the motor 190. That is, when the belt 175 is moved or rotated by the rotation of the motor 190, the second belt fastening portion 183 also moves, such that the panel connection block 180 moves upward or downward.

<Sliding Operation of Lifting Part>

Figure 11A:
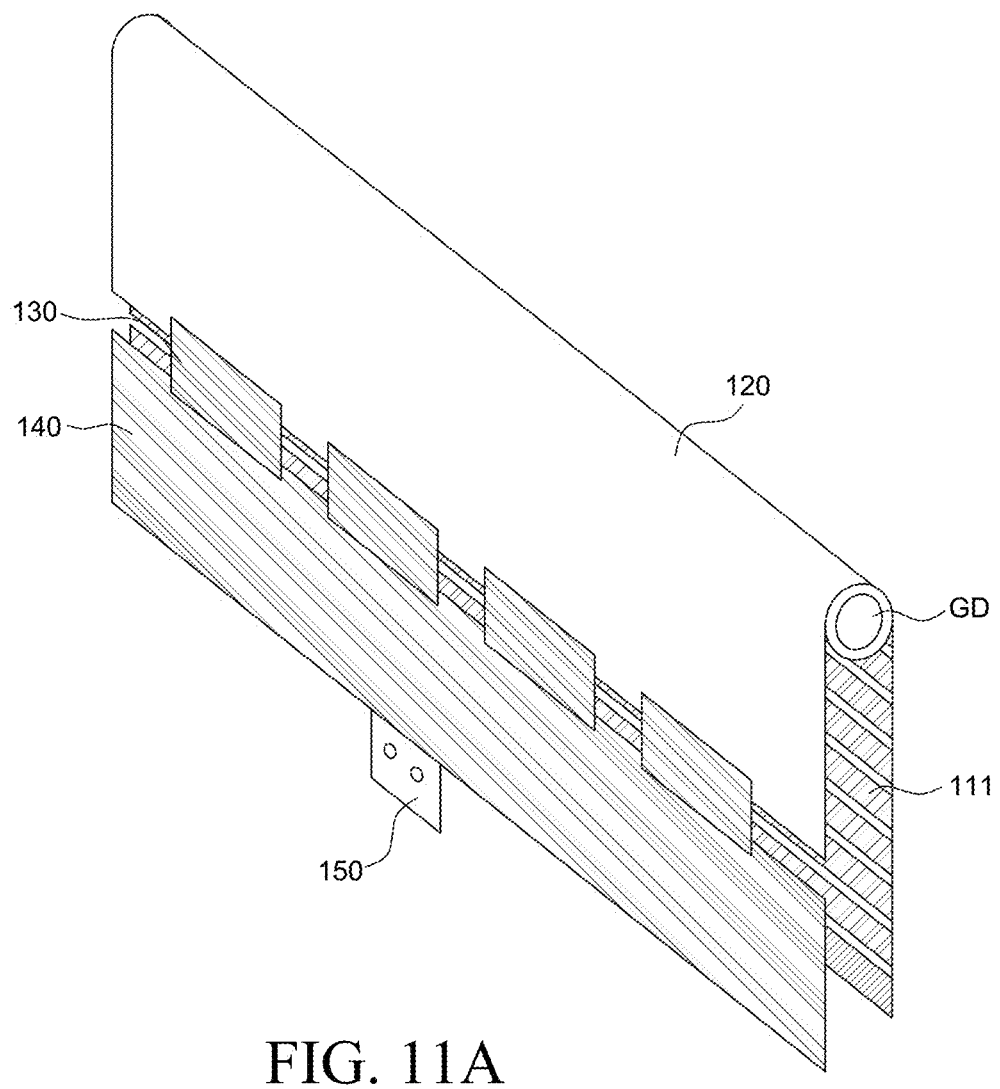
FIGS. 11A and 11B are front perspective views of the display device according to an embodiment of the present disclosure.
Figure 11B:
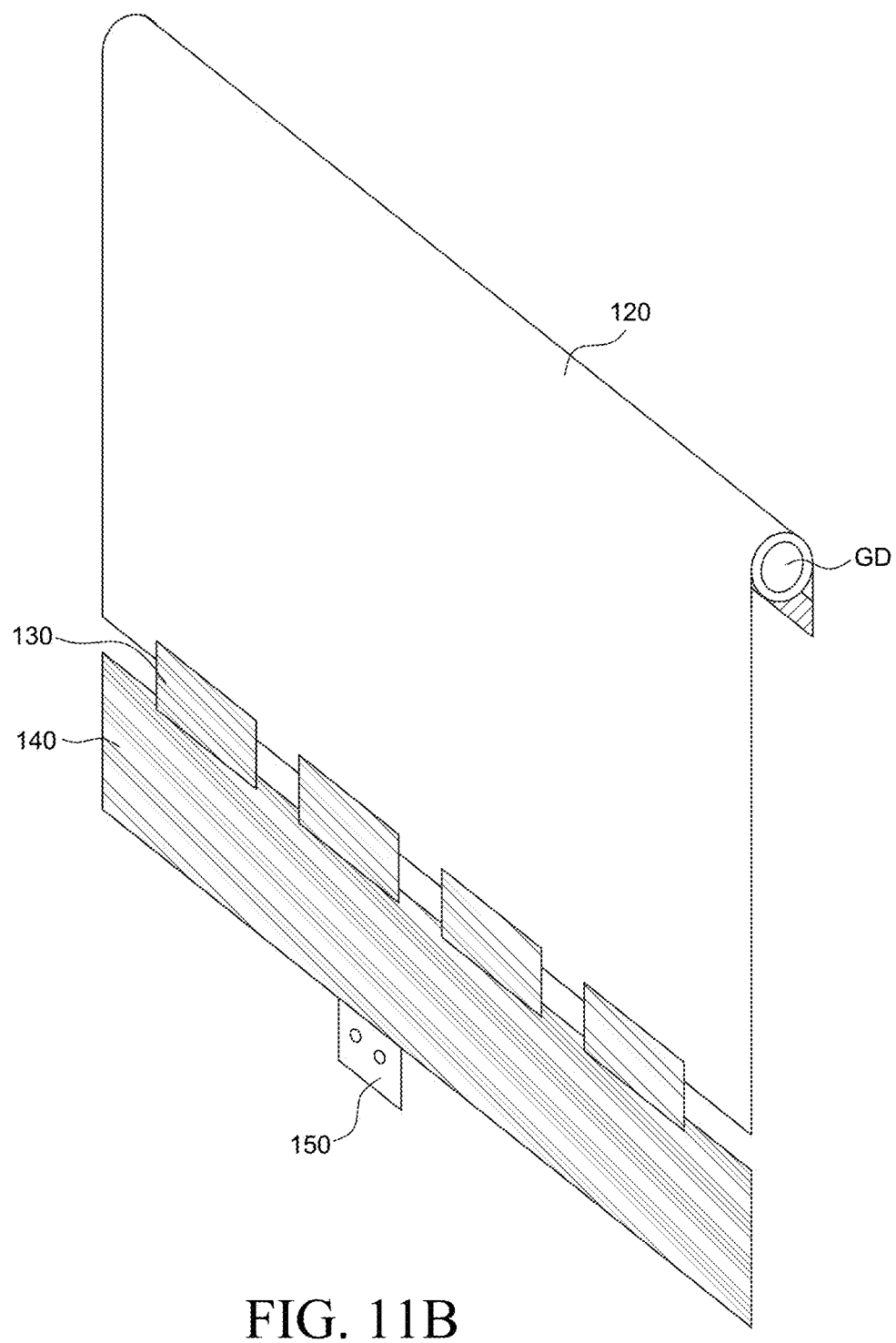
Figure 12A:
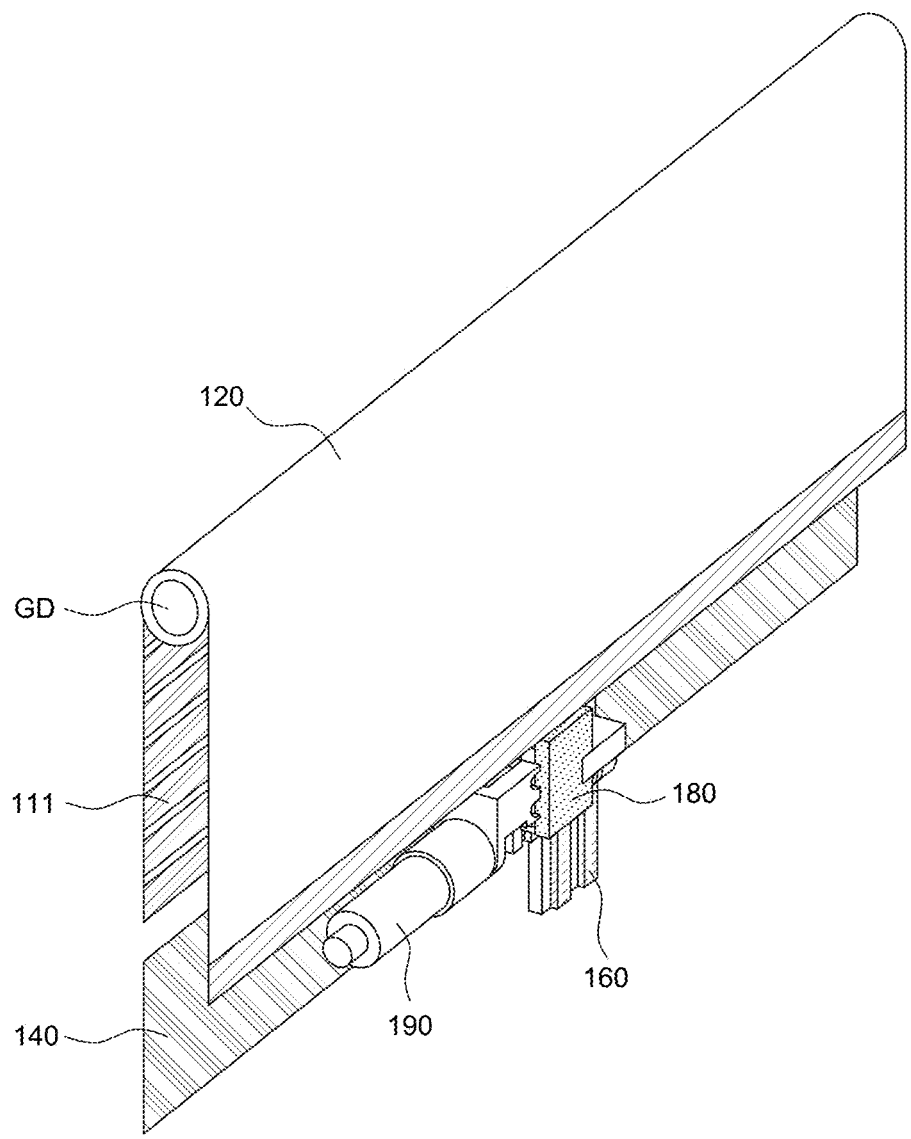
FIGS. 12A and 12B are rear perspective views of the display device according to an embodiment of the present disclosure.
Figure 12B:
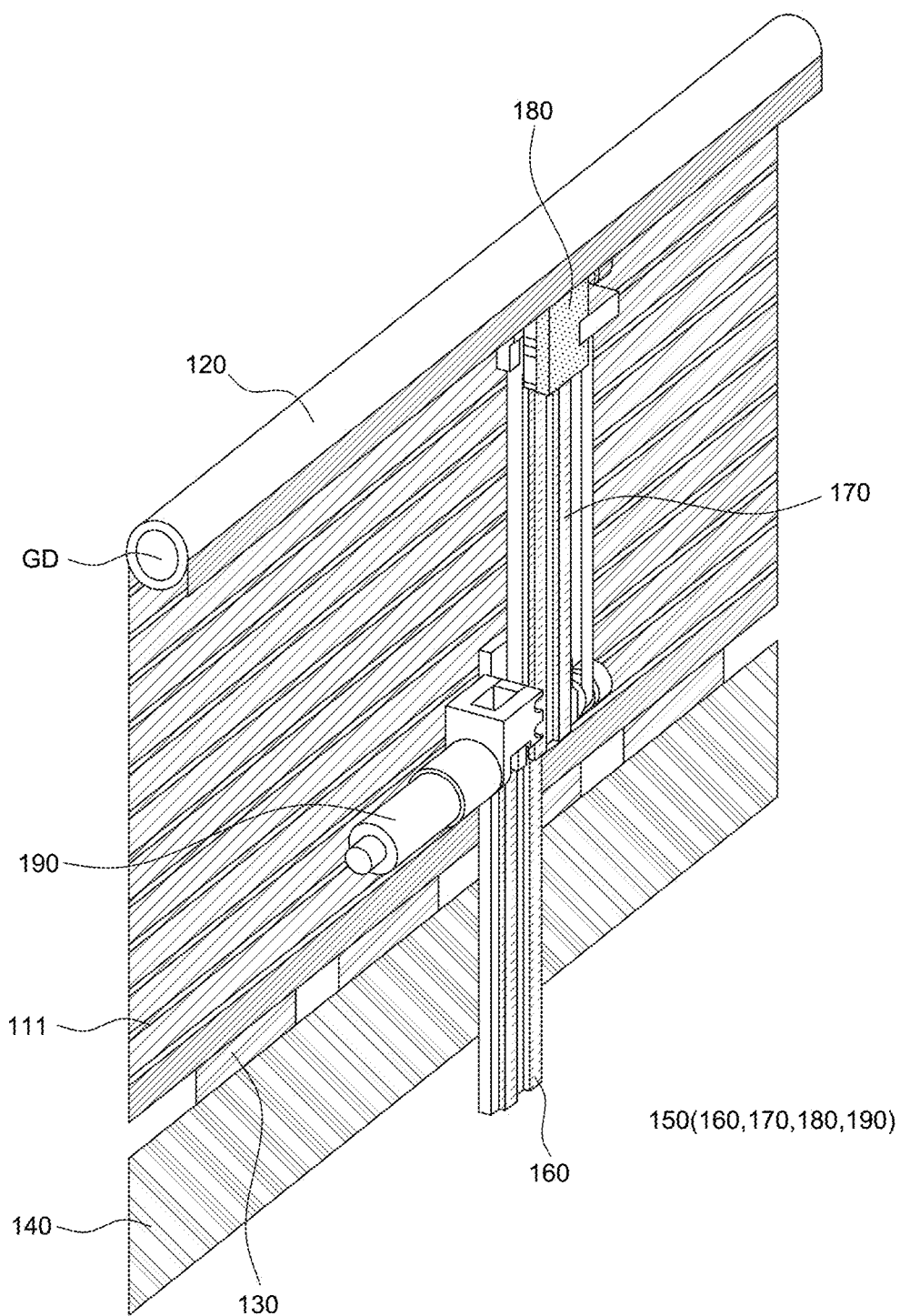

FIGS. 11A and 11B are front perspective views of the display device according to an embodiment of the present disclosure. FIGS. 12A and 12B are rear perspective views of the display device according to an embodiment of the present disclosure. For the convenience of description, FIGS. 11A to 12B illustrate only the display panel 120, the back cover 111, the flexible film 130, the printed circuit board 140, the guide drum GD, and the lifting part 150, among the various components of the display device 100. FIGS. 11A and 12A are views illustrating a state in which the movable unit 170 of the lifting part 150 is positioned at the lowermost position. FIGS. 11B and 12B are views illustrating a state in which the movable unit 170 of the lifting part 150 is positioned at the uppermost position.

As shown in FIGS. 11A and 12A, when the end of the display panel 120 is positioned at the lowermost position, the movable unit 170 of the lifting part 150 overlaps with the fixing unit 160, and the panel connection block 180 is disposed at the end of the fixing unit 160. That is, when the end of the display panel 120 is positioned at the lowermost position, the movable unit 170 and the panel connection block 180 of the lifting part 150 may each be at the lowest possible position.

As shown in FIGS. 11B and 12B, when the end of the display panel 120 is positioned at the uppermost position, the movable unit 170 is maximally moved upward to not overlap with the fixing unit 160, and the panel connection block 180 is disposed at the end of the movable unit 170. That is, when the end of the display panel 120 is positioned at the uppermost position, the movable unit 170 and the panel connection block 180 of the lifting part 150 may each be at the highest possible position.

As shown in FIGS. 11A to 12B, the display panel 120 slides as the lifting part 150 is moved upward or downward by the operation of the motor 190.

First, when the motor 190 rotates, the belt 175 is rotated or moved by the connection shaft 173, the first belt pulley 174a, and the second belt pulley 174b, such that the second rail portion 172 of the movable unit 170 rectilinearly moves along the first rail portion 162 of the fixing unit 160. That is, the connection shaft 173 rotates when the motor 190 rotates. When the connection shaft 173 rotates, the first belt pulley 174a and the second belt pulley 174b rotate. When the first belt pulley 174a and the second belt pulley 174b rotate, the belt 175 rotates or moves. In this case, because the first belt fastening portion 163 of the fixing unit 160 is fixed to the particular position on the belt 175, the second rail portion 172 of the movable unit 170 is rectilinearly moved along the first rail portion 162 of the fixing unit 160 by the rotation or movement of the belt 175. Therefore, finally, the movable unit 170 moves upward or downward based on the fixing unit 160.

At the same time, when the motor 190 rotates, the fourth rail portion 182 of the panel connection block 180 rectilinearly moves along the third rail portion 176 of the movable unit 170. For example, the connection shaft 173 rotates when the motor 190 rotates. When the connection shaft 173 rotates, the first belt pulley 174a and the second belt pulley 174b rotate. When the first belt pulley 174a and the second belt pulley 174b rotate, the belt 175 rotates or moves. In this case, because the second belt fastening portion 183 of the panel connection block 180 is fixed to the particular position on the belt 175, the fourth rail portion 182 of the panel connection block 180 is rectilinearly moved along the third rail portion 176 of the movable unit 170 by the rotation or movement of the belt 175. Therefore, finally, the panel connection block 180 moves upward or downward based on the movable unit 170.

Therefore, the movable unit 170 and the panel connection block 180 simultaneously move relative to the fixing unit 160. The end of the display panel 120, which is connected to the panel connection block 180 through the second fixing block B2, and the guide drum GD, which is disposed at the upper side of the lifting part 150, move upward or downward. As a result, an area of the display area AA exposed to the outside is changed.

Hereinafter, a more detailed operation of the lifting part 150 will be described with reference to FIG. 13.

Figure 13:
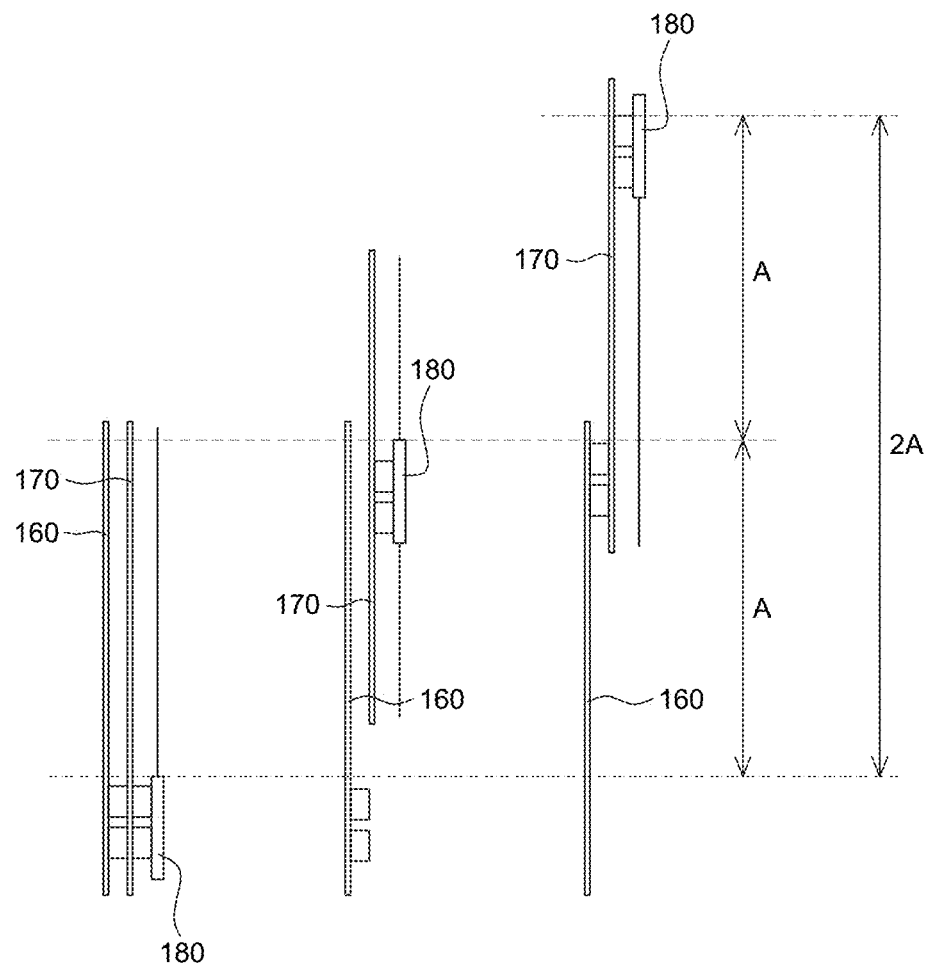
FIG. 13 is a cross-sectional view of a rectilinear motion of the lifting part of the display device according to an embodiment of the present disclosure.

FIG. 13 is a cross-sectional view illustrating a rectilinear motion of the lifting part of the display device according to an embodiment of the present disclosure. For the convenience of description, FIG. 13 simply illustrates only the fixing unit 160, the movable unit 170, and the panel connection block 180 among the various components of the lifting part 150.

First, a process of moving the movable unit 170 and the panel connection block 180 upward will be described with reference to FIGS. 11A to 13. As illustrated in the left side of the FIG. 13, when the end of the display panel 120 is positioned at the lowermost position, both the movable unit 170 and the panel connection block 180 are positioned at the lowermost position. When the motor 190 rotates to move the movable unit 170 and the panel connection block 180 upward, the connection shaft 173 rotates. When the connection shaft 173 rotates, the first belt pulley 174a and the second belt pulley 174b rotate. When the first belt pulley 174a and the second belt pulley 174b rotate, the belt 175 rotates or moves. In this case, because the first belt fastening portion 163 of the fixing unit 160 is fixed to the particular position on the belt 175, the second rail portion 172 of the movable unit 170 is moved upward along the first rail portion 162 of the fixing unit 160 by the rotation or movement of the belt 175.

In addition, the panel connection block 180 is also moved upward by the rotation of the motor 190 at the same time when the movable unit 170 moves upward along the first rail portion 162 of the fixing unit 160. For example, the connection shaft 173 rotates when the motor 190 rotates. When the connection shaft 173 rotates, the first belt pulley 174a and the second belt pulley 174b rotate. When the first belt pulley 174a and the second belt pulley 174b rotate, the belt 175 rotates or moves. In this case, because the second belt fastening portion 183 of the panel connection block 180 is fixed to the particular position on the belt 175, the fourth rail portion 182 of the panel connection block 180 is moved upward along the third rail portion 176 of the movable unit 170 by the rotation of the belt 175.

Therefore, the movable unit 170 and the panel connection block 180 are moved upward by the rotation of the motor 190. As shown in FIG. 13, given that a maximally raised height of the movable unit 170 with respect to a position of the fixing unit 160 is A, a maximally raised height of the panel connection block 180 with respect to the position of the movable unit 170 may also be A. Therefore, when the movable unit 170 is moved upward by A/2 with respect to the position of the fixing unit 160 by the rotation of the motor 190, the panel connection block 180 is also moved upward by A/2 with respect to the position of the movable unit 170, such that the panel connection block 180 is moved upward by A with respect to the position of the fixing unit 160, as illustrated in the center of FIG. 13. When the movable unit 170 is moved upward by A with respect to the position of the fixing unit 160 by an additional rotation of the motor 190, the panel connection block 180 is also moved upward by A with respect to the position of the movable unit 170, such that the panel connection block 180 is moved upward by 2A with respect to the position of the fixing unit 160, as illustrated in the right side of FIG. 13.

Next, a process of moving the movable unit 170 and the panel connection block 180 downward will be described with reference to FIGS. 11A to 13. As illustrated in the right side of FIG. 13, when the end of the display panel 120 is positioned at the uppermost position, both the movable unit 170 and the panel connection block 180 are positioned at the uppermost position. When the motor 190 rotates in a direction opposite to the direction in which the motor rotates during the process of moving the movable unit 170 and the panel connection block 180 upward, the connection shaft 173 rotates to move the movable unit 170 and the panel connection block 180 downward. When the connection shaft 173 rotates, the first belt pulley 174a and the second belt pulley 174b rotate. When the first belt pulley 174a and the second belt pulley 174b rotate, the belt 175 rotates or moves. In this case, because the first belt fastening portion 163 of the fixing unit 160 is fixed to the particular position on the belt 175, the second rail portion 172 of the movable unit 170 is moved downward along the first rail portion 162 of the fixing unit 160 by the rotation or movement of the belt 175.

In addition, the panel connection block 180 is also moved downward by the rotation of the motor 190 at the same time when the movable unit 170 moves downward along the first rail portion 162 of the fixing unit 160. For example, when the motor 190 rotates in the direction opposite to the direction in which the motor rotates during the process of moving the movable unit 170 and the panel connection block 180 upward, the connection shaft 173 rotates. When the connection shaft 173 rotates, the first belt pulley 174a and the second belt pulley 174b rotate. When the first belt pulley 174a and the second belt pulley 174b rotate, the belt 175 rotates or moves. In this case, because the second belt fastening portion 183 of the panel connection block 180 is fixed to the particular position on the belt 175, the fourth rail portion 182 of the panel connection block 180 is moved downward along the third rail portion 176 of the movable unit 170 by the rotation or movement of the belt 175.

Therefore, the movable unit 170 and the panel connection block 180 are moved downward by the rotation of the motor 190. As shown in FIG. 13, assuming that the maximally raised height of the movable unit 170 with respect to the position of the fixing unit 160 is A, the maximally raised height of the panel connection block 180 with respect to the position of the movable unit 170 may also be A. Therefore, when the movable unit 170 is moved downward by A/2 with respect to the position of the fixing unit 160 by the rotation of the motor 190, the panel connection block 180 is also moved downward by A/2 with respect to the position of the movable unit 170, such that the panel connection block 180 is moved downward by A with respect to the position of the fixing unit 160, as illustrated in the middle side of FIG. 13. When the movable unit 170 is moved downward by A with respect to the position of the fixing unit 160 by an additional rotation of the motor 190, the panel connection block 180 is also moved downward by A with respect to the position of the movable unit 170, such that the panel connection block 180 is moved downward by 2A with respect to the position of the fixing unit 160, as illustrated in the left side of FIG. 13.

The slidable display device may include the motor configured to operate the lifting part configured to move the display panel in the upward/downward direction. In a case of a general slidable display device in the related art, a lifting part may need to be moved by a movement distance of the display panel. For this reason, because the lifting part may need to be moved by the same amount as the display panel to expand a display area of the display panel, it may be difficult to ensure spatial utilization of the display device, and an overall volume of the display device may increase.

Embodiments of the present disclosure are directed to a display device that substantially obviate one or more problems due to the limitations and disadvantages of the related art. In the display device 100 according to an embodiment of the present disclosure, the lifting part 150 includes the fixing unit 160, the movable unit 170, the panel connection block 180, and the motor 190, and the fixing unit 160 and the panel connection block 180 are fastened to the belt 175 of the movable unit 170. Therefore, it may be possible to ensure a wider area of the display panel 120 that may be exposed to the outside of the display device 100. In addition, when the belt 175 is rotated or moved by the rotation of the motor 190, not only the movable unit 170 moves relative to the fixing unit 160, but also the panel connection block 180 connected to the end of the display panel 120 also moves from the lowermost end of the movable unit 170 to the uppermost end of the movable unit 170. Therefore, when the movable unit 170 of the lifting part 150 moves from the lowermost position to the uppermost position, a distance by which the end of the display panel 120 moves may be twice the movement distance of the movable unit 170.

Therefore, according to the display device 100 according to an embodiment of the present disclosure, it may be possible to ensure a wider variable area of the display area AA of the display panel 120. Even though the display device 100 according to an embodiment of the present disclosure, in which the end of the display panel 120 is attached to the panel connection block 180 fastened to the belt 175 of the movable unit 170, includes the lifting part 150 having the same height as that of the display device in the related art, the end of the display panel 120 is moved upward by a distance, which is twice the movement distance of the movable unit 170, when the movable unit 170 moves from the lowermost position to the uppermost position. Therefore, it may be possible to ensure a wider variable area of the display area AA of the display panel 120 that is exposed to the outside.

The example embodiments of the present disclosure can also be described as follows:

According to an aspect of the present disclosure, there is provided a display device. The display device comprises a display panel, and a lifting part configured to move one end of the display panel in an upward or downward direction. The lifting part may include: a fixing unit fixed to the other end of the display panel a movable unit configured to move in the upward or downward direction, a motor connected to the movable unit and configured to move the movable unit in the upward or downward direction, and a panel connection block fixed to the movable unit and configured such that the one end of the display panel is fixed to the panel connection block.

In some embodiments, the panel connection block and the movable unit may be configured such that when the movable unit moves from a lowermost position to an uppermost position, the panel connection block may move a distance that is twice a distance moved by the movable unit.

In some embodiments, the fixing unit may include: a first base portion, a first rail portion disposed on one surface of the first base portion, and a first belt fastening portion fixed to the first base portion, and the movable unit may include: a second base portion, a second rail portion disposed on one surface of the second base portion and configured to operate in conjunction with the first rail portion, a connection shaft connected to the motor, a first belt pulley connected to the connection shaft, a second belt pulley configured to rotate while operating in conjunction with the first belt pulley, and a belt configured to be rotated by the first belt pulley and the second belt pulley and connected to a part of the first belt fastening portion.

In some embodiments, the second rail portion may be configured to rectilinearly move along the first rail portion when the motor rotates, and the belt is rotated by the connection shaft, the first belt pulley, and the second belt pulley.

In some embodiments, the movable unit further may include a third rail portion disposed on the other surface of the second base portion, the panel connection block may include: a third base portion, a fourth rail portion disposed on one surface of the third base portion and configured to operate in conjunction with the third rail portion, and a second belt fastening portion fixed to the third base portion, and a part of the belt may be connected to the second belt fastening portion.

In some embodiments, the fourth rail portion may be configured to rectilinearly move along the third rail portion when the motor rotates, and the belt is rotated by the connection shaft, the first belt pulley, and the second belt pulley.

In some embodiments, the panel connection block is configured to move along the movable unit.

In some embodiments, the display device may further include: a guide drum at an end of the movable unit, disposed in a direction perpendicular to a direction of a rectilinear motion of the movable unit, and configured to support the display panel.

In some embodiments, the display device may further include: a first fixing block in a form of a bar and connected to the fixing unit to fix the other end of the display panel to the fixing unit, and a second fixing block in a form of a bar and connected to the panel connection block to fix the one end of the display panel to the panel connection block.

In some embodiments, the display panel may include: a flexible film connected to the other end of the display panel, and a printed circuit board connected to the flexible film. The other end of the display panel may be fixed to the fixing unit as the printed circuit board or the back cover may be fixed by the first fixing block. The one end of the display panel may be fixed to the panel connection block as the back cover may be fixed by the second fixing block.

In some embodiments, the printed circuit board may be fixed by the first fixing block.

In some embodiments, the back cover may be fixed by the first fixing block.

In some embodiments, the housing part may include an upper frame, a lower frame, a front frame, and a lateral frame. The lateral frame may include a guide rail configured to slide in accordance with a movement of the lifting part.

In some embodiments, the display panel may include: a first display area configured to be exposed to the outside when the movable unit is positioned at the lowermost position, and a second display area having a region that is configured to be exposed to the outside and that varies depending on a movement of the movable unit in the upward or downward direction.

In some embodiments, the fixing unit may include: a first base portion fixed to the lower frame of the housing part, a first rail portion disposed on one surface of the first base portion, and a first belt fastening portion fixed to the first base portion.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

It will be apparent to those skilled in the art that various modifications and variations can be made in the display device of present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. A display device comprising:
   a display panel;
   a guide drum configured to support the display panel; and
   a lifting part configured to move one end of the display panel in an upward or downward direction, the lifting part comprising:
      a fixing unit fixed to the other end of the display panel;
      a movable unit configured to move in the upward or downward direction;
      a motor connected to the movable unit and configured to move the movable unit in the upward or downward direction; and
      a panel connection block fixed to the movable unit and configured such that the one end of the display panel is fixed to the panel connection block,
   wherein the guide drum is disposed in a direction perpendicular to a direction of a rectilinear motion of the movable unit at an end of the movable unit.

2. The display device of claim 1, wherein the panel connection block and the movable unit are configured such that when the movable unit moves from a lowermost position to an uppermost position, the panel connection block moves a distance that is twice a distance moved by the movable unit.

3. The display device of claim 1, wherein:
   the fixing unit comprises:
      a first base portion;
      a first rail portion disposed on one surface of the first base portion; and
      a first belt fastening portion fixed to the first base portion, and
   the movable unit comprises:
      a second base portion;
      a second rail portion disposed on one surface of the second base portion and configured to operate in conjunction with the first rail portion;
      a connection shaft connected to the motor;
      a first belt pulley connected to the connection shaft;
      a second belt pulley configured to rotate while operating in conjunction with the first belt pulley; and
      a belt configured to be rotated by the first belt pulley and the second belt pulley and connected to a part of the first belt fastening portion.

4. The display device of claim 1, wherein the panel connection block is configured to move along the movable unit.

5. The display device of claim 1, further comprising:
   a first fixing block in a form of a bar and connected to the fixing unit to fix the other end of the display panel to the fixing unit; and
   a second fixing block in a form of a bar and connected to the panel connection block to fix the one end of the display panel to the panel connection block.

6. The display device of claim 1, further comprising:
   a housing part configured to accommodate the display panel and the lifting part,
   wherein the housing part comprises an upper frame, a lower frame, a front frame, and a lateral frame, and
   wherein the lateral frame comprises a guide rail configured to slide in accordance with a movement of the lifting part.

7. The display device of claim 3, wherein the second rail portion is configured to rectilinearly move along the first rail portion when the motor rotates, and the belt is rotated by the connection shaft, the first belt pulley, and the second belt pulley.

8. The display device of claim 3, wherein:
   the movable unit further comprises a third rail portion disposed on the other surface of the second base portion,
   the panel connection block comprises:
      a third base portion, a fourth rail portion disposed on one surface of the third base portion and configured to operate in conjunction with the third rail portion; and
      a second belt fastening portion fixed to the third base portion, and a part of the belt is connected to the second belt fastening portion.

9. The display device of claim 5, further comprising:
   a back cover disposed on a rear surface of the display panel,
   wherein the display panel comprises:
      a flexible film connected to the other end of the display panel; and
      a printed circuit board connected to the flexible film,
   wherein the other end of the display panel is fixed to the fixing unit as the printed circuit board or the back cover is fixed by the first fixing block, and
   wherein the one end of the display panel is fixed to the panel connection block as the back cover is fixed by the second fixing block.

10. The display device of claim 6, wherein the display panel comprises:
    a first display area configured to be exposed to the outside when the movable unit is positioned at the lowermost position; and
    a second display area having a region that is configured to be exposed to the outside and that varies depending on a movement of the movable unit in the upward or downward direction.

11. The display device of claim 6, wherein the fixing unit comprises:
    a first base portion fixed to the lower frame of the housing part;
    a first rail portion disposed on one surface of the first base portion; and
    a first belt fastening portion fixed to the first base portion.

12. The display device of claim 8, wherein the fourth rail portion is configured to rectilinearly move along the third rail portion when the motor rotates, and the belt is rotated by the connection shaft, the first belt pulley, and the second belt pulley.

13. The display device of claim 9, wherein the printed circuit board is fixed by the first fixing block.

14. The display device of claim 9, wherein the back cover is fixed by the first fixing block.

* * * * *